June 25, 1968
R. D. RUMSEY
3,389,940
VISCOUS SHEAR CRITICAL SHAFT DAMPERS
Filed Aug. 8, 1966
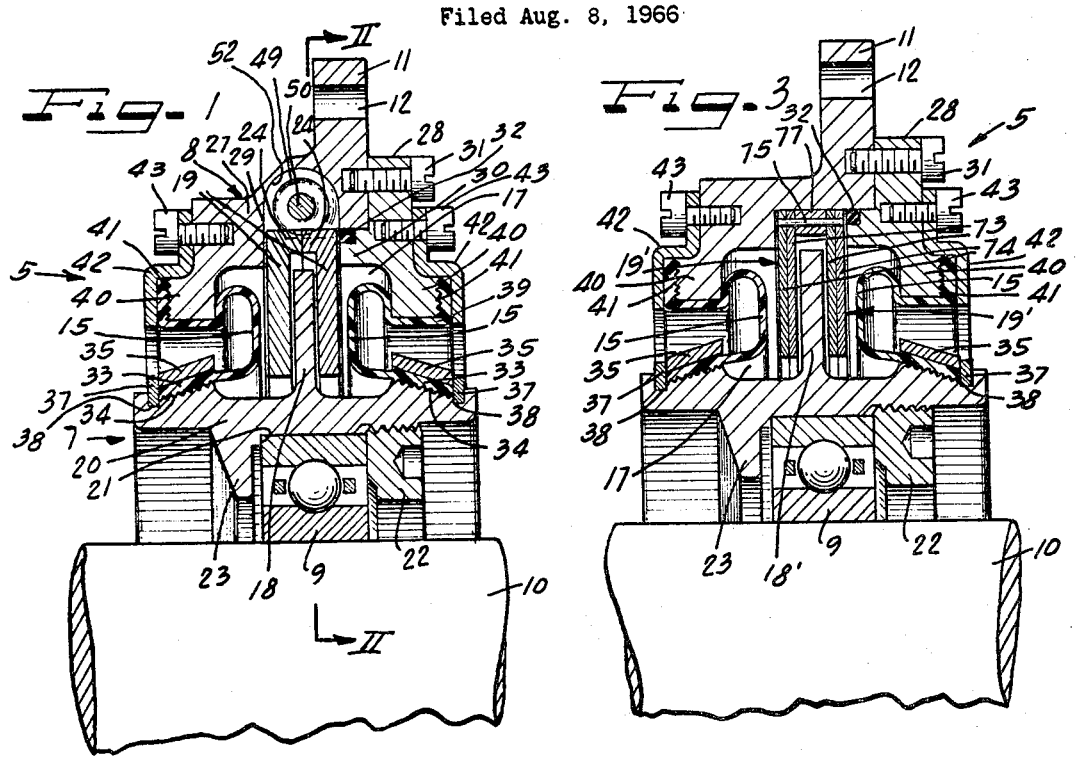
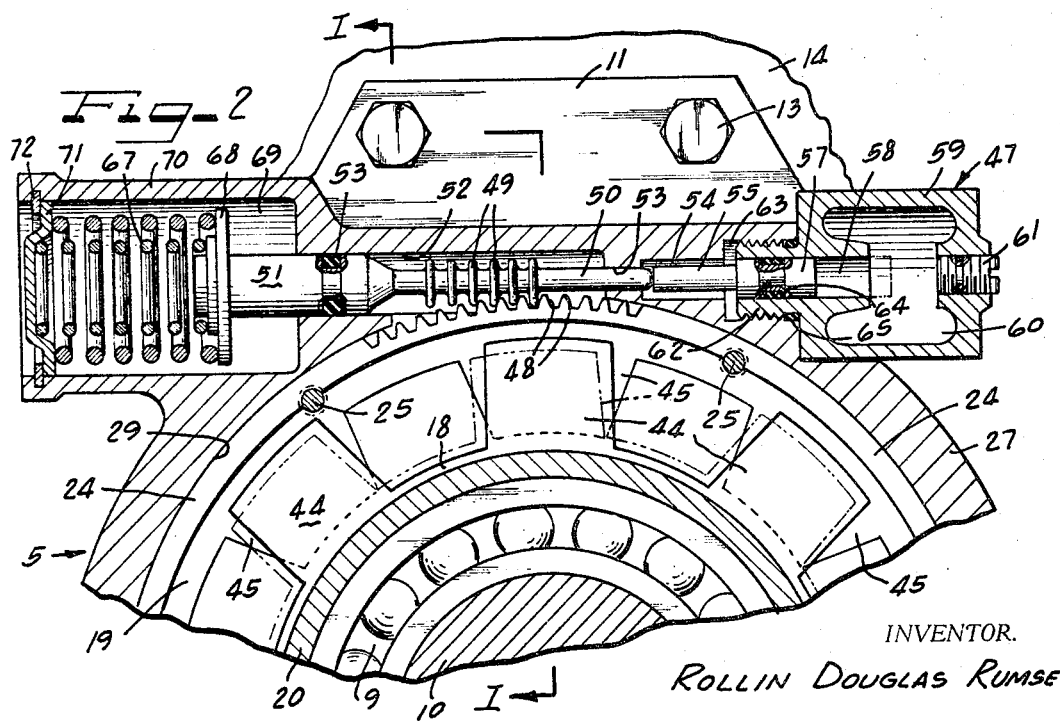
INVENTOR.
ROLLIN DOUGLAS RUMSEY
BY
ATTORNEYS United States Patent Office 3,389,940
Patented June 25, 1968

3,389,940
VISCOUS SHEAR CRITICAL SHAFT DAMPERS
Rollin Douglas Rumsey, Buffalo, N.Y., assignor to Houdaille Industries, Inc., Buffalo, N.Y., a corporation of Michigan
Filed Aug. 8, 1966, Ser. No. 576,490
12 Claims. (Cl. 308—26)

This invention relates to shaft dampers and more particularly concerns novel viscous shear plate type dampers especially adapted for damping bearing mounts on vibrating shafts, that is, to stabilize bearing mounts for long shafts in order to damp out critical speed shaft vibrations.

When long shafts are supported in rigid bearings, they tend to develop a whirl type of vibration and, as the critical speed increases, nodes occur in the shaft at various speed levels and, if the shaft is not adequately damped, destructive amplitudes will result.

Accordingly, it is an important object of the present invention to provide a novel damper construction for efficiently damping radial vibratory shaft motion.

Another object of the invention is to provide a novel damper construction especially constructed and arranged to be mounted in association with one of the bearings on a shaft, and more particularly at an intermediate point along the length of the shaft.

A further object of the invention is to provide a new shaft damper especially adapted for mounting in association with a shaft to damp radial or oscillatory motions and employing annular discs or plates in shear film spaced relation with respect to a viscous coupling damping liquid.

Still another object of the invention is to provide a novel temperature compensated viscous shear shaft damper.

It is also an object of the invention to provide novel means in a viscous shear damper for adjusting the spacing or area of relative shear film opposition of the discs or plates in a viscous shear damper for automatically compensating for temperature effected variations in viscosity of the coupling damping fluid.

Other objects, features and advantages of the present invention will be readily apparent from the following detailed description of certain preferred embodiments thereof taken in conjunction with the accompanying drawings, in which:

FIGURE 1 is a fragmentary longitudinal sectional detail view through a damper construction embodying features of the invention, and taken substantially along the line I—I of FIGURE 2;

FIGURE 2 is a fragmentary transverse sectional detail view taken substantially along the line II—II of FIGURE 1; and FIGURE 3 is a view similar to FIGURE 1 but showing a modification.

In the exemplary form of damper 5 depicted in FIGURES 1 and 2, complementary radially inner and radially outer annular concentric housing structures 7 and 8, respectively, are provided. One of the housing structures, herein the structure 7 has annular bearing means 9 in the form of a ball bearing assembly the inner race of which corotatively engages about a shaft 10. The other housing structure 8 is provided with means conveniently comprising a radially extending flange 11 including suitable bolt holes 12 therethrough to pass the shanks of bolts or screws by which the housing structure 8 is fixedly attached to a mounting structure 14 which may comprise a rigid bracket or frame member of the structure in which the shaft 10 is rotatably mounted. Respective resiliently yieldable annular end wall connectors 15 are secured to and connect the respective opposite ends of the housing structures 7 and 8 and define therewith a sealed annular chamber 17 which is operatively filled with a viscous damping fluid, desirably a silicone of any preferred centistroke rating. Relative radial vibrations imparted to either of the housing structures 7 or 8 are damped by a viscous fluid coupling between respective radially extending annular damping disc plates on and forming part of the housing structures within the chamber 17 and having opposed working surfaces in shear film spaced relation, herein comprising a radially extending damper plate 18 on the housing structure 7 and a pair of annular radially inwardly extending damper legs 19 on the housing structure 8. This type of damper is especially suitable for use on long shafts such as occur on helicopter drives where more than one rotor blade is employed, on shafts in aircraft where several propellers may be interconnected in order to preclude failure of any one engine causing loss of power on that propeller, on ships where extremely long driveshafts are sometimes employed as on battleships and aircraft carriers where it is desirable to separate engine rooms to reduce vulnerability to torpedo attacks, and the like.

The inner annular housing structure 7 includes a ring-shaped body 20 having an inside diameter formation to receive the outer race of the bearing assembly centrally between the ends of the housing member, with one end of the outer race thrusting against an axially facing shoulder 21 and clamped by a ring nut 22 threadedly engaging the inner perimeter of the housing member and driven against the opposite end of the outer race. On one side of the bearing assembly 9 the ring nut 22 provides a protective guard over the ball gap between the bearing races, and on the opposite side an integral radially inwardly extending annular flange 23 on the housing member 20 serves this purpose.

While the damper plate disc 18 is desirably integral in one piece with the inner housing member 20, the pair of damper disc plates 19 are conveniently constructed as separate plate elements with spacer means between their radially outer margins, herein comprising respective complementary axially extending integral spacer flanges 24. Thereby assembly of the damper disc plates 19 with the damper disc plate 18 therebetween is facilitated. After such assembly, the damper plates 19 may be permanently secured together as by means of rivets 25 extending through and between the outer margins of the plate assembly.

Support of the damper plates 19 in substantially concentric shear film spaced relation to the respective opposite faces of the damper plate 18 is effected by the outer housing structure 8 which comprises a pair of complementary annular housing members 27 and 28. A rabbet groove 29 in the inner perimeter of the housing member 27 receives the assembled margins of the damper plates 19 therein, and the housing member 28 retains the plate assembly and is assembled concentric with the housing member 27, with an axially extending annular flange 30 telescopically engaging within the outer end of the rabbet groove 29, and securing screws 31 fastening the radially outer portion of the housing member 28 fixedly to the opposing face of the housing member 27 adjacent to the base of the attachment flange 11 which forms an integral part of the member 27. A sealing ring 32 seals the joint between the members 27 and 28 against leakage of fluid from within the chamber 17.

Each of the end wall connectors 15 is desirably of substantial identical construction and in the form of a one-fold or loop diaphragm bellows. One margin of each of the resilient wall connectors 15 comprises a thickened attachment flange 33 secured to an outwardly oblique annularly serrated mounting surface 34 on the respective end portion of the housing member 20 against which the flange 33 is clamped by a frusto-conical retainer ring 35 held in place by a snap ring 37 engaged in a respective radially outwardly opening groove 38 at the outer end of the mounting surface 34. Attachment to the outer housing members 27 and 28 is effected by means of substantially L-shaped respective attachment flanges 39 on the members 15 engaging respective identical mounting flanges 40 on the outer housing members having axially facing respective serrated surfaces 41 against which radially outwardly extending terminal portions of the flanges 39 are firmly clamped by respective clamping retainer rings 42 secured to the outer housing members as by means of screws 43. Through this arrangement, the chamber 17 is thoroughly sealed against leakage of the hydraulic damping liquid therefrom and against entry of contaminants into the working chamber. Further, relative radial vibratory displacements of the housing structures 7 and 8, most generally caused by the shaft 10, though are necessarily so, are accommodated by the resilient flexibility of the members 15, while the resistance to torque deflections of the members 15 holds the housing structure 7 against rotation relative to the housing structure 8. In addition, since the members 15 loop into the chamber 17 and thus displace a substantial volume of such chamber, expansion and contraction of the damping fluid due to temperature changes is efficiently accommodated while bellows diaphragm pressure is maintained on the damping fluid to maintain the gaps between the plates 18 and 19 constantly filled for maximum efficiency.

Viscous shear damping is effected by the resistance to shear of the shear films of damping fluid between the respective opposing working surfaces of the confronting axial faces of the damper plates 18 and 19. Ample tolerance clearance is afforded between the free edges of the plates 18 and 19 and the confronting surfaces of the opposing respective radially facing structures. Contact friction between the plates 18 and 19 is avoided by permitting a limited amount of axial play between the joined plates 19 and the opposing axial retaining wall surfaces afforded by the groove 29 and the flange 30, whereby to accommodate possible slight axial motion of the shaft 10 relative to the mounting structure 14.

A desirable feature of the damper 5 resides in the provision of means to compensate for variation in shear strength or viscosity of the damping fluid which varies with temperature. In one desirable arrangement, the area of relative opposition of confrontation of the damper plates 18 and 19 is varied substantially proportional to changes in viscosity, that is as the viscosity increases the area of the confronting working surfaces is diminished and as the viscosity decreases such area is increased. To this end, the damper plates 18 and 19 are generally tooth shaped, the plate 18 being subdivided into equal radially projecting teeth 44 of substantial width with the intervening notches opening radially outwardly, and the plates 19 are subdivided into equal radially inwardly projecting teeth 45 with the intervening notches opening radially inwardly. In width the teeth 44 and 45 are substantially equal, although the teeth 45 are preferably somewhat wider at their base ends than the tip ends of the teeth 44 in the example shown. Also, the intervening notches are preferably of a size relationship wherein the notches intervening between the teeth 44 flare from a root width which is slightly less than the mouth width of the notches between the teeth 45 to a substantially greater mouth width than the root width of the notches between the teeth 45. Through this arrangement, when the damping fluid is of lowest viscosity due to high temperature conditions, maximum surface opposition of the teeth 44 and 45, as shown in full lines in FIGURE 2 is desirable. As the viscosity of the damping liquid increases, the area of effective working surface opposition of the teeth 44 and 45 is substantially proportionally diminished by relative angular displacement of the teeth to a maximum displacement wherein only a minimum area of the teeth working surfaces remain in opposition. The arrangement is such, however, that there is at all times opposition of the working surfaces at the tip margins of the teeth 44 with continuous annular surfaces afforded by the outer marginal portions of the plates 19.

In order to effect angular relative adjustment of the plates 18 and 19 automatically responsive to prevailing temperature conditions affecting the damping liquid in the damper, a temperature responsive actuator 47 is mounted on the outer housing structure 8 and more particularly the housing member 27 and operative to rotate the plate assembly 19 in the groove 29. For this purpose, the joined outer perimeters of the plates 19 are provided with a segmental series of rack teeth 48 with which mesh complementary annular flange-like actuator teeth 49 on a reciprocably mounted rod 50 guided by an integral plunger 51 slidably reciprocably mounted in a guide bore 52 generally tangential to the outer perimeter of the plates 19 and thereby opening into the groove 29 and enabling meshing of the teeth 48 and 49. A ring seal 53 about the plunger 51 prevents damping fluid leakage thereby.

Means are provided in the actuator 47 for automatically shifting the rod 50 longitudinally responsive to temperature changes. For this purpose, the free end portion of the plunger 50 extends in guided relation through a bore 53 into a counterbore 54 wherein its tip thrusts against a plunger 55 integral with a piston 57 slidably reciprocable within a cylinder 58 of a capsule 59 having a chamber 60 filled with a temperature sensitive control liquid such as suitable silicone fluid filled thereinto through a suitable filler opening closed by a sealed plug 61. Desirably the capsule 59 is of a type which is adapted to be mounted on the housing member 27 by securing an externally threaded neck 62 into a receptive counterbore 63 in the housing member. The arrangement is such that in the cold condition of the damper the piston 57 is adapted to be received to a maximum inward projection in the cylinder 58, as indicated in dot dash outline when the control liquid is contracted, whereas when the control liquid is expanded by increase in temperature the piston 57 is forced from the chamber 60 toward the actuator pin 50, shown in the full line position in FIGURE 2. Fluid leakage from the chamber 60 is prevented by an annular seal 64 about the piston 57 and leakage from within the damper past the joint between the capsule 59 and the housing member 27 is prevented by an annular seal 65

Automatic return of the linear actuator rod 50 from the hot position to the cold position is effected by a compression spring pack 67 bearing at one end against a thrust flange 68 on the outer end portion of the plunger 51 within a chamber 69 in a housing boss 70 integral with the housing member 27. At its opposite end the spring pack bears against a closure disc 71 held in place by a snap ring 72. Normally the spring pack 67 operates to drive the actuator rod 50 toward the cold position while the temperature sensitive liquid in the chamber 60 acts in opposition to the spring to drive the rod toward the hot position, whereby the ring assembly of the actuator plates 19 is automatically oscillatably turned to effect proper relative adjustment of the damper teeth 44 and 45 to compensate for temperature variation and achieve the uniform damping strength over a wide temperature range.

Where relatively non-critical damping requirements are adequate, the substantially simplified arrangement of FIGURE 3 may serve the purpose. In this modified construction, all elements of the damper 5' may be identical with the damper 5, as evidenced by identical reference numerals to identify corresponding parts, but instead of the damper plate discs being toothed and adjustment to compensate for temperature variations being effected by relatively rotating the plates, temperature compensation is effected by changing the gap or shear film spacing between the plates. For this purpose, the inner housing damper plate 18' is a continuous solid ring disc. The damper plate discs 19' are also continuous ring members, but each comprises bimetallic laminae comprising in inner lamina 73 and an outer lamina 74 in each instance and secured in proper shear film spaced relation to the disc 18' by attachment as by means of suitable rivets 75 to a spacer ring 77 engaged between the outer margins of the plate assemblies 19'. The inner laminae 73 may, for example, comprise steel plates while the outer laminae 74 may comprise aluminum or brass plates. Through this arrangement a maximum normal spacing between the opposing working faces of the disc 18' and the inner lamina 73 of each of the disc assemblies 19' prevails during cold conditions of the damping fluid in the chamber 17 and as the temperature increases and thereby the viscosity of the damping fluid decreases, the bimetallic plates function to decrease the shear film spacing gaps between the working faces.

From the foregoing it will be apparent that an efficient, compact shaft damper of the bearing mount type has been provided utilizing the advantages of viscous shear damping. Automatic compensation for damping strength variations due to temperature induced viscosity changes in the damping fluid are effectively provided for.

It will be understood that variations and modifications may be effected without departing from the spirit and scope of the novel concepts of this invention.

I claim as my invention:
1. A viscous shear critical shaft damper comprising: complementary radially inner and radially outer annular concentric housing structures, one of which has annular bearing means and the other of which has means for securing it fixedly; respective resiliently yieldable annular end wall connectors secured to and connecting the respective opposite ends of said structures, enabling relative movement of said structures and defining therewith a sealed annular chamber; viscous damping fluid substantially filling said chamber; and respective radially extending annular damping plates on and forming part of each of said structures within said chamber and having opposed working surfaces in shear film spaced relation whereby the shear film damping fluid coupling between said plates will damp relative vibrations imparted to either of said structures in the plane of said coupling.

2. A damper as defined in claim 1, in which said end wall connectors comprise diaphragm bellows each having a fold loop projecting into and occupying space within said chamber and minimizing the fluid volume thereof but affording volume expansion capacity by yielding in response to expansion of the damping fluid in the chamber.

3. A damper as defined in claim 1, in which said connectors comprise diaphragm-like members having annular attachment flanges, and means clamping said attachment flanges to the respective housing structures.

4. A damper as defined in claim 1, in which one of said mounting structures includes an annular housing member and the annular damping plate thereof is integal with such housing member, and the damping plates of the other housing structure comprise a pair of plates separately formed and mounted within a groove in said other housing structure with one of the pair of plates on one side of said integral plate and the other of said pair of plates on the other side of said integral plate.

5. A damper as defined in claim 1, in which one of said housing structures has a single damper plate and the other of said housing structures has a pair of damper plates one of which is on each respective side of said single damper plate, said pair of damper plates being mounted for axial adjustment relative to said other housing structure to maintain substantially uniform shear film spaced relationship between the damper plates when there is relative axial shifting of the housing structures.

6. A damper as defined in claim 1, in which the inner of said housing structures has said bearing means adapted to engage about a rotary shaft, and the outer of said housing structures has said means for securing it fixedly comprising a flange to be attached to a fixed supporting structure within which said shaft is rotatable.

7. A damper as defined in claim 1, including means for varying the shear film spaced relationship between said working surfaces responsive to temperature variations affecting the viscosity of said damping fluid.

8. A damper as defined in claim 7, in which said means for varying the spacing comprise a temperature responsive actuator, and said damping plates are subdivided into respective annular series of spaced teeth, said actuator being operatively connected to said plates to adjust the area of relative opposition of the working surfaces on the teeth in accordance with temperature variations.

9. A damper as defined in claim 8, in which the damping plate on the outer of said housing structures is of ring form and mounted for rotation relative to said outer of said housing structures, and said actuator is mounted on said outer of said housing structures, said actuator and said damper plate ring having meshing teeth through which the actuator rotatably moves said ring.

10. An actuator as defined in claim 9, in which the teeth of the actuator are on a reciprocable rod, a spring biasing the rod in one reciprocal direction and a temperature responsive device shifting the rod in the opposite reciprocal direction in opposition to the spring bias.

11. A damper as defined in claim 7, in which said damper plates comprise bimetallic laminae which are temperature responsive to vary the shear film spacing between the plates.

12. In combination in a viscous shear damper of the character described:
a housing defining, a sealed chamber;
and including relatively movable structures having means for respective attachment to relatively vibrationally movable members;
viscous damping fluid in said chamber;
damper plates in said chamber, respectively connected with said structures and disposed in face-to-face shear film relation, said plates comprising respective spaced series of teeth;
and means operative to effect relative shifting of said plates to vary the area of opposition of the plates to compensate for variations in viscosity of the damping fluid.

No references cited.

MARTIN P. SCHWADRON, *Primary Examiner.*

FRANK SUSKO, *Examiner.*